United States Patent [19]

Kissell

[11] 4,426,683

[45] Jan. 17, 1984

[54] PNEUMATIC SHOCK TESTING MACHINE WITH DIGITAL CONTROL

[75] Inventor: Robert R. Kissell, New Carlisle, Ohio

[73] Assignee: Avco Corporation, Huntsville, Ala.

[21] Appl. No.: 317,188

[22] Filed: Nov. 2, 1981

[51] Int. Cl.³ .............................................. G01M 17/04
[52] U.S. Cl. ........................................ 364/508; 73/11;
356/375; 364/550; 364/579
[58] Field of Search ............... 364/508, 506, 579, 550, 364/551; 73/11; 356/375

[56] References Cited

U.S. PATENT DOCUMENTS

| | | | |
|---|---|---|---|
| 2,580,299 | 12/1951 | Hunicke | 73/11 |
| 4,271,475 | 6/1981 | Sahajdak | 364/506 |
| 4,365,306 | 12/1982 | House et al. | 364/551 |

*Primary Examiner*—Errol A. Krass
*Assistant Examiner*—Clifford L. Tager
*Attorney, Agent, or Firm*—Robert J. McNair, Jr.; Abraham Ogman

[57] ABSTRACT

A control system for a pneumatically powered shock testing machine is presented which utilizes digital logic and an operator programmed computer. The control system was implemented on a shock machine having a carriage assembly that is lifted by an air piston to a specified height above an anvil plate, then accelerated downward until the carriage impacts a shock generator element resting on the anvil. An optically encoded guide rod is attached to the side of the carriage. As the carriage moves up and down, an optical sensor attached to the machine base monitors motion of the guide rod. The measure of this motion is forwarded to a microcomputer. Secondly, charge air pressure used to provide downward acceleration of the carriage is measured by a transducer and this information is also relayed in digital form to the microcomputer. From these two inputs, the microcomputer generates instructions to sequence solenoid actuated valves which operate the various sections of the charge cylinder assembly. The microcomputer includes a microprocessor, several read only memories, a random access memory and the necessary support logic and interface signal drivers and amplifiers. Its function is to process the data from the optical and pressure sensors and therefrom initiate closed loop control of the shock machine in accordance with instructions programmed in by the operator at a control panel.

8 Claims, 4 Drawing Figures

PNEUMATIC SHOCK TESTING MACHINE WITH DIGITAL CONTROL

BACKGROUND OF THE INVENTION

A shock testing machine control system is presented which provides improved pulse generation accuracy and repeatability.

The prior art pneumatic shock testing machine consists of a generally rectangular reaction mass assembly that is mounted to shock isolator type feet. The top of the reaction mass assembly may be a meter or so above the floor. A vertically extending cylindrical opening in the top of the reaction mass assembly serves as a receptacle for a charge cylinder assembly which includes an air driven piston. The uppermost end of the charge cylinder assembly terminates at a relatively massive anvil flange which has a multiplicity of bolt holes around its periphery to allow the assembly to be fixedly secured to the topside of the reaction mass assembly. The piston rod of the charge cylinder extends upwardly through the anvil flange terminating at an impact plate. Mounted atop the impact plate is a carriage assembly. Test specimens are secured to the topside of the carriage assembly.

To operate, air under 100 psi pressure or thereabouts is valved to push the piston rod vertically upward to an extended position. There the carriage assembly is stopped and a shock generator element placed on the surface of the anvil. With the shock generator element in place, the cylinder control valves are sequenced to cause the air driven piston to accelerate downward carrying the carriage assembly toward the anvil. This action crushes the shock generator element between the impact plate and the anvil, quickly decelerating the test specimen to zero velocity. The characteristics of the shock generator element determines the shape of the shock pulse experienced by the specimen under test. The height of the piston travel and the amount of air pressure applied to the downward accelerating piston determines the magnitude of the shock pulse. A braking unit within the charge cylinder is used to dampen out carriage rebound after the pulse.

The control system for the prior art machine operates generally as follows. A guide rod approximately a half meter long is secured at one end so as to extend vertically upward from the top of the reaction mass assembly. It is positioned so as to be immediately adjacent to the carriage assembly. Microswitches are mounted on the guide rod in such a manner that the switches are activated by the carriage as it moves along the vertical axis. In order to set the height that the carriage rises above the shock generating device the microswitch that stops the lift cycle is moved up or down the guide rod to respectively increase or decrease the lift height. The carriage will then lift until it activates the switch which sets a pneumatic brake and terminates the lifting action. It is necessary to physically move the microswitch to adjust the lift or fall height parameter. In a like fashion the trigger pulse for a monitor oscilloscope is generated as the carriage activates a microswitch when passing a preset point in the down stroke. This is done by physically moving the switch to the desired trigger point. The application of the pulse dampening brake is also determined by activating a microswitch which is moved to the desired point of brake application by manually moving the switch up or down the fixed guide rod. System timing is derived from a motor driven cam which activates other microswitches to turn the pneumatic valves on and off and thus control the cycling rate of the machine.

My invention improves on the prior art machine by eliminating reliance on microswitches to indicate when an event should occur. I utilize digital logic and optical sensors to determine position. Addition of an on-board microcomputer makes it possible to program parameters which had to be manually set in the prior art machine.

SUMMARY OF THE INVENTION

An improved shock testing machine is presented wherein the control system utilizes digital logic and computer programmed closed loop control. The invention was implemented on a pneumatic type shock testing machine of the same general configuration as described for the prior art machine. This included a reaction mass assembly, a charge cylinder assembly and a carriage assembly mounted on top of the impact plate which was at the upper termination of the piston rod portion of the charge cylinder. To the edge of the carriage assembly an optically encoded guide rod was attached. This guide rod moves vertically up and down in step with the carriage motion. By attaching the uppermost end of the optically encoded guide rod to the side of the carriage, the optics sensor and light source can be placed within the machine console where it is protected. The optical sensor keeps track of the position of the carriage with respect to the anvil. The sensed position data is translated into a binary bit pattern suitable for processing in a microcomputer.

Secondly, a pressure transducer is attached to the air supply fitting of the charge air assembly. This transducer converts the value of the charge air pressure into an electrical signal suitable for processing in the microcomputer.

Thirdly, input-output devices at a control panel allow the operator to establish operating parameters and verify inputs by visual means. As implemented, the operator can program in the height the carriage rises, the point of brake application, the amount of charge air pressure to be applied for accelerating the carriage on the down stroke, and the point at which the trigger pulse is to be generated. The values programmed in by the operator are stored in the memory of the microcomputer.

The microcomputer includes a microprocessor, several read only memories, a random access memory and the necessary support logic and interface signal drivers and amplifiers. Its function is to process the data from the optical and pressure sensors and therefrom initiate closed loop control of the shock machine in accordance with instructions programmed in by the operator at the control panel.

Briefly, the objects of the invention are to provide a shock pulse control system which: enables the operator to program in parameters via a keyboard rather than having to manually position microswitches and adjust pressure valves; greatly improves the accuracy and repeatability of the shock pulses; enables remote control of the machine; and air pressure is dynamically regulated during the pulse generation cycle.

DESCRIPTION OF THE PREFERRED EMBODIMENT

Figure 1:
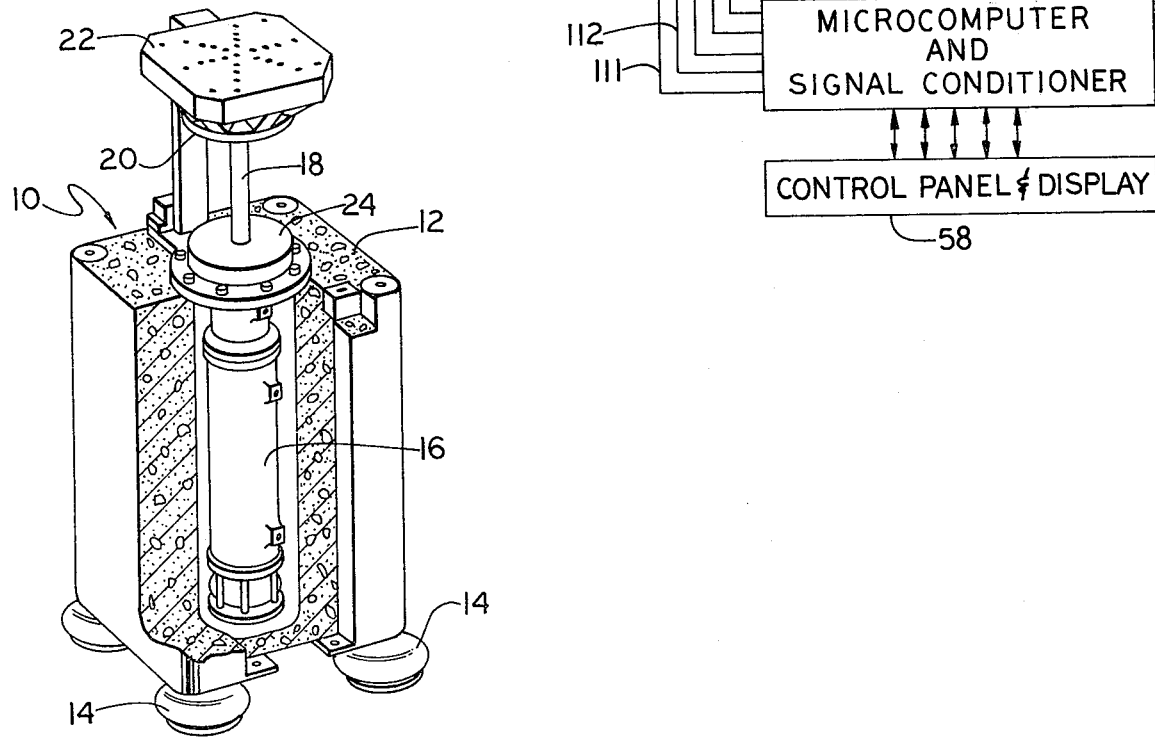
FIG. 1 is an isometric view of a pneumatic shock testing machine showing the reaction mass assembly cutaway to display the air charge assembly.

FIG. 1 shows a partially cutaway view of a pneumatic shock testing machine 10. The base cabinet consists of a reaction mass assembly 12 which rests on four shock isolator feet 14. A vertically extending generally cylindrical opening along the central axis serves as a receptacle for charge cylinder assembly 16. An air driven piston within charge cylinder assembly 16 has connected thereto an upward extending piston rod 18. The piston rod terminates at an impact plate 20. Mounted atop the impact plate is a carriage assembly 22. Test specimens undergoing shock testing are mounted atop carriage assembly 22.

To impart shock to a test specimen, piston rod 18 is extended much as depicted in FIG. 1 so that carriage 22 is a specified height above anvil 24 which is the top end flange of charge cylinder assembly 16. A shock generator element (not shown) is then placed on top of anvil 24. This can typically be a wafer of some resilient material such as sheet rubber. With the shock generator element in place, the air cylinder is given a charge of compressed air so as to accelerate the carriage assembly downward until impact plate 20 crashes into shock generator element 26 which is held up by anvil 24. A very high - G shock pulse can be imparted to a test specimen in this way. The reaction mass assembly 12 is developed by filling the base cabinet with concrete as shown in FIG. 1.

Figure 2:
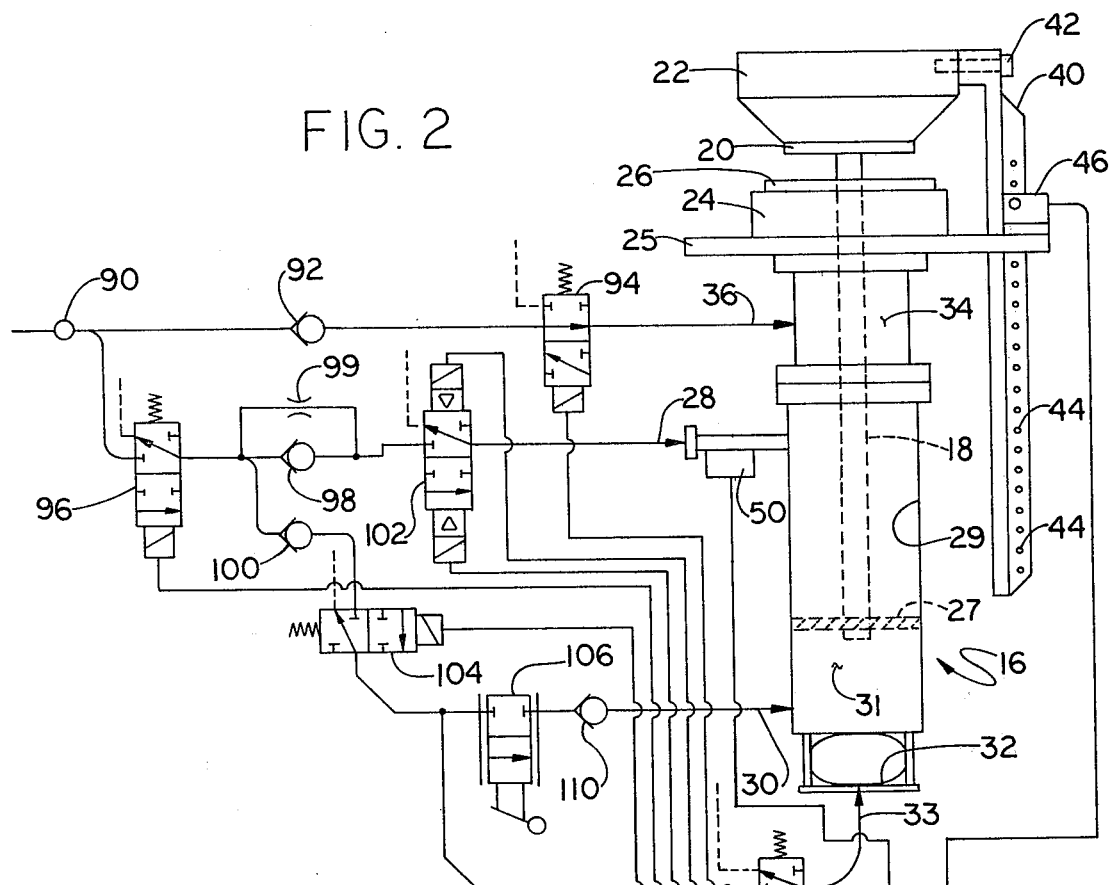
FIG. 2 is a block diagram of the closed loop control system.

FIG. 2 depicts the same charge cylinder assembly 16 as shown in FIG. 1. Piston rod 18 extends upward through a relatively massive anvil flange 24. It will be understood that there are a multiplicity of bolt holes around the periphery 25 of anvil flange 24 to allow the charge cylinder assembly to be secured in place in the reaction mass assembly depicted in FIG. 1.

The topmost end of piston rod 18 terminates at impact plate 20. Carriage assembly 22 is secured to impact 20 and shock generator element 26 is shown in place between anvil 24 and impact plate 20.

The FIG. 2 charge cylinder assembly 16 shows functionally how the assembly operates. Piston 27 slides up and down within the cylinder 29. Pressurized air entering the cylinder through pipe 28 will cause piston 27 to drop lower in the cylinder. If there is no pressure within pipe 28 and the cylinder is pressurized through pipe 30, the piston rises in the cylinder raising carriage assembly 22 with respect to anvil 24. As implemented, region 31 of the cylinder can only be pressurized if air-pillow 32 is inflated. This is because air-pillow 32 covers a port in the bottom of air cylinder portion 31. Release of pressure in supply line 33 causes small air-pillow 32 to collapse, thereby bringing about the uncovering of the bottom port. This action quickly vents pressurized air from portion 31 of the cylinder.

There is a piston rod clamping brake 34 near the top end of charge cylinder assembly 16. Brake 34 is actuated by allowing pressurized air to enter via pipe 36. Thus, if air lines 28 and 36 are not pressurized while air pressure is supplied to lines 30 and 33, the carriage 22 will rise to its maximum height. Then, if pressure is supplied to the brake via line 36, the carriage will be clamped in position even if air pressure is removed from the bottom of piston 27. Further, the brake 34 will hold the carriage at its high point while pressurized air is supplied via line 28 to the upper side of the piston. When a specific value of air pressure exists in the top end of the air cylinder, the brake is released by venting air out through line 36. Release of the brake allows the carriage 22 to accelerate downward until impact plate 20 bangs into shock generator element 26 which is supported by anvil flange 24.

Figure 3:
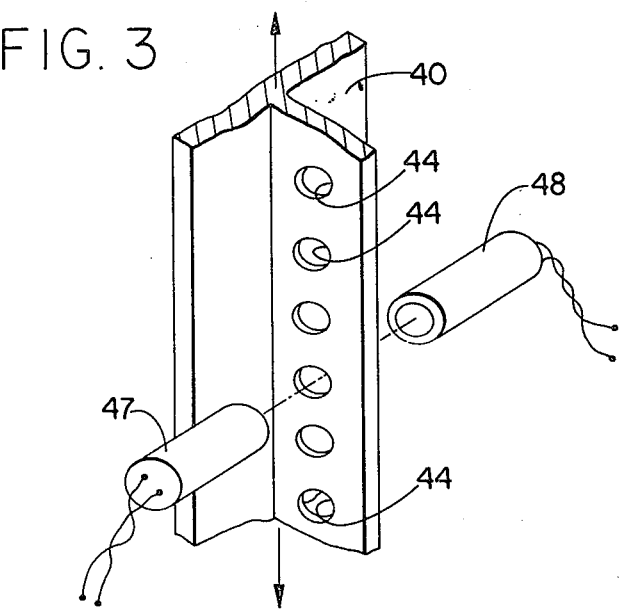
FIG. 3 is a perspective view of a portion of the optically encoded guide rod together with the light source and sensor.

The height to which carriage 22 rises as well as the sensing and calibration of carriage movement is monitored by the optically encoded guide rod 40. Guide rod 40 is secured at one end to the side of carriage 22 by bolt means 42. Thus, it moves up and down in synchronism with the carriage. As implemented (See FIG. 3 for more detail) the guide rod was of T-shape cross section having along its base leg a multiplicity of equispaced holes 44. In the unit reduced to practice, the holes 44 were spaced at 0.1 inch intervals. An optical sensor mechanism 46 sits astride the base leg of optical guide rod 40. Sensor mechanism 46 is secured to peripheral ring 25 which is part of anvil flange 24. The key components of sensor mechanism 46 are shown in FIG. 3. There is a light source 47 which could typically be an infrared light emitting diode in back of a bull's eye lens. On the far side of the base leg of the guide rod is a light detector unit 48 which is typically a phototransistor positioned in a light collimating shield. Light detector unit 48 receives a signal from light source 47 whenever a hole 44 is positioned as shown in FIG. 3. Movement of optical rod along the vertical axis results in a generally square type wave being emitted by the detector. By counting pulses the position of the carriage with respect to the anvil flange can be ascertained. It will be appreciated that if the diameter of holes 44 are one-half the spacing between holes, there will be essentially a square wave output from the detector unit 48.

The second data input needed to control the operation of the shock machine is a measure of the charge air pressure on the top side of the piston 27. This measurement was obtained from pressure sensor 50 which in the unit reduced to practice was a strain gauge. The strain gauge was cemented on a diaphragm which expanded and contracted due to changes in charge pressure making the change in strain gauge resistance proportional to the force being exerted on the diaphragm. The resistance change was then converted to a DC voltage and this voltage translated in a A to D converter to a binary bit stream for input into microcomputer 52 via signal line 54.

The carriage position data entering the microcomputer 52 via signal line 56 together with charge pressure data on signal line 54 were found to be adequate for controlling the shock pulse generator. As implemented, microcomputer 52 was constructed on a single printed circuit board and included an 8-bit microprocessor, several read only memories, a random access memory, together with the necessary support logic and interface modules such as line drivers and amplifiers. The microcomputer processes the signals from pressure sensor 50 and optical sensor mechanism 46 in accordance with the program stored in the read-only memory. From this information, the microcomputer then generates instructions to control the pneumatic valves which control air flow to the several sections of charge cylinder assembly 16. Closed loop dynamic control is accomplished according to instructions established by the operator at the control console (See FIG. 4).

Figure 4:
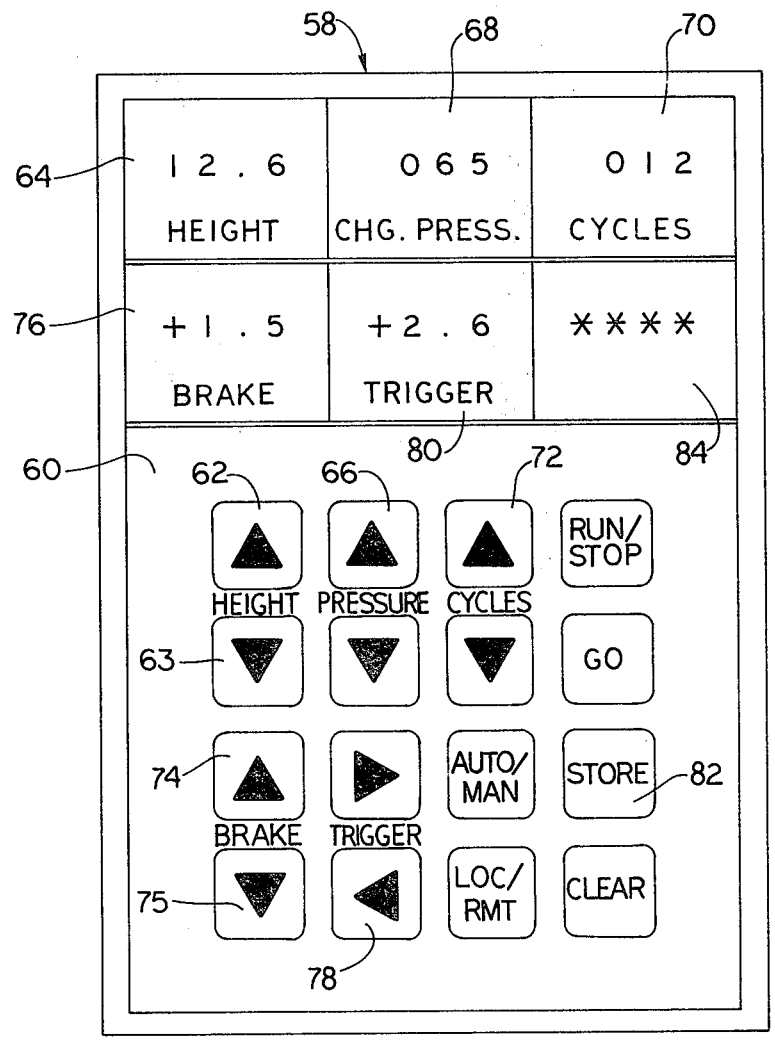
FIG. 4 is a top view of the control panel showing both operator selector options and displays.

FIG. 4 shows the combined control panel and display 58. The control panel 60 in the unit reduced to practice included 16 push buttons. Push buttons 62 and 63 control the height that the carriage 22 shown in FIG. 2 rises above the anvil. The height programmed into the memory of the microcomputer is presented in block 64 of the alpha-numeric display. Pressing button 62 increases the height while pressure on button 63 lowers the programmed height. The figures shown in FIG. 4 signify a height of 12.6 inches for the carriage.

Push button 66 and its companion underneath program the value of charging pressure programmed on the top side of the piston 27 of FIG. 2 when the carriage is being readied for descent. This charge pressure value is shown in display block 68 and is read lbs/in$^2$.

The number of shock pulses of a given type through which the machine cycles are displayed in block 70. This number can be raised or lowered by means of push button 72 and its companion button underneath.

The position of the carriage above impact on the shock generator element 26 (See FIG. 2) when the brake is to be activated on the downstroke of the piston is programmed in by means of push buttons 74 and 75. The height of the carriage above the shock generator element measured in inches, when braking is to begin is displayed in block 76.

The height of the carriage above the shock generator element when an oscilloscope trigger pulse is to be generated is programmed into the microcomputer by means of push button 78 and its upper companion. This value as measured in inches of separation on the downstroke is shown in block 80.

With all five pairs of these push buttons it will be appreciated that the operator increases the displayed value by holding his finger on the uppermost button. Continued pressure on a push button makes the value displayed step along sequentially in the same direction. To decrease a value, the lower button of the pair is pressed.

Once all five of the programmable values are established, the operator will then push the "store" button 82. The functions of the other five push buttons shown in FIG. 4 are self explanatory possibly with the exception of the dual nature of three of them. For example, "auto/man" means that the machine is in automatic or manual mode of operation. Pressing on the "auto/man" button will call out the mode to be displayed in block 84. Holding down the push button can make the machine step from one mode to the next. The same concept applies to the run/stop and local/remote push buttons.

Now that the microcomputer has been programmed by the operator, reference is again made to FIG. 2 to describe the functioning and control of the pneumatic system. A pressurized supply of dry air enters the system at fitting 90. The air supply in the unit reduced to practice was pressurized to a value of at least 100 psig. One section of the air supply lines passes through check valve 92 and thence through normally open solenoid actuated valve 94 to piston rod clamping brake 34. This means that brake 34 is always actuated whenever the air supply is connected unless solenoid actuated valve 94 is energized. Thus, if electric power is lost, the brake is automatically actuated.

A second section of the air supply line is routed through normally open solenoid valve 96. When solenoid valve 96 is actuated, pressurized air flows through, supplying both check valves 98 and 100. Check valve 98 is bypassed by a capillary sized bleed-off tube 99 which allows line pressure to slowly drop instead of being held by check valve 98 when solenoid 96 is de-energized to the state shown in FIG. 2. As shown in FIG. 2, valve 96 has a venting port connected thereto which purges line pressure built up downstream of the valve when it is in the position depicted. Beyond check valve 98, the air supply line passes through solenoid actuated, pilot assisted valve 102. Valve 102 allows pressurized air to be supplied to the top side of air piston 27.

The line section passing through check valve 100 is connected to normally open solenoid operated valve 104. The downstream side of valve 104 branches. One leg passes through manually operated throttle valve 106. The other leg passes through pressure operated valve 108. Check valve 110 is between throttle valve 106 and bottom portion 31 of the cylinder.

The air valves and hence the operation of the entire air cylinder assembly are controlled by the electrical signals on control lines 111, 112, 113, 114 and 115. These signals are generated by the microcomputer in response to instructions programmed in at control panel 58. A typical sequence might be as follows. Release brake 34 by energizing line 115. Energize lines 111 and 112 to supply lift pressure to the carriage. The setting of throttle valve 106 to some midrange value will assure a medium speed lift rate. When the carriage reaches the height programmed in by the operator, valve 104 is de-energized by terminating the line 11 signal. As soon as valve 104 drops to the open status shown in FIG. 2, line pressure on the downstream side leaks off through the vent causing valve 108 to switch to the position shown. This action causes air-pillow 32 to collapse, thereby venting pressure from cylinder portion 31.

At the same time signal line 111 is de-energized, line voltage on signal line 115 will terminate. This action resupplies air to brake 34 thereby holding the carriage in the raised position. Then, keeping line 112 energized, line 113 is energized to cause valve 102 to switch states and bring about charging of the upper end of the air cylinder. Valve 102 is the type which remains in the state it has been switched to until it receives a voltage from the other solenoid to reverse its state. When the pressure measured by sensor 50 reaches a value slightly above the programmed value, lines 112 and 113 are de-energized. Capillary tube 99 allows pressure in the charging to slowly leak down. When it crosses the programmed value, line 115 is energized to release brake 34, permitting carriage 22 to accelerate downward under the impetus of the charge stored in the cylinder.

As the downward stroke speeds to its conclusion, the optical sensor 46 keeps count of the intervals crossed. When impact is imminent, the signal on line 115 is terminated turning on the brake to prevent the carriage from rebounding after impact against shock generator element 26. Finally, line 114 is energized to switch valve 102 to the position shown and thereby release the residual pressure in the charging cylinder. The system would then be ready for recycling.

To facilitate calibration and accommodate different thicknesses of the shock generator element 26, there is a new reference point established for each set up. This is implemented by having the microcomputer direct the carriage to free fall to the top of the shock generator element at the beginning of each operating cycle. Placement of the carriage on top of the shock generator element establishes as a reference that specific hole in optically encoded guide rod 40 which is instantaneously in line with sensor 48 (See FIG. 3) when the carriage reaches bottom. For the remainder of the test, that reference point is retained in computer memory and all height measurements stem therefrom.

While a transmissive type optical system has been described, it will be understood that a reflective type approach would perform equally as well. The reflective approach would utilize a collimated light source reflecting back to a detector from the guide rod. The guide rod could have alternating black (absorptive) and white (reflective) bars whose passage the detector could take into computer memory. Data rates generated by either type of optical system are sufficiently low so that a microcomputer can readily handle the information.

The microcomputer is probably the single most important new component to be integrated into the shock machine. This one unit provides all of the required logic and math to complete the tasks described. Future modifications to the shock machine will be easily accomplished by changing the firmware which controls the computer. The sophistication of the machine, for example—the operation of the control panel, display or ability to cycle, will be as simple or complex as the firmware. The ability to make programming changes insures future adaptability of the machine in a cost efficient manner with no additional hardware added to the machine.

While only a single embodiment of the invention has been presented, various modifications will be apparent to those skilled in the art. Therefore, the invention should not be limited to the specific illustration disclosed, but only by the following claims.

I claim:

1. Control apparatus for a machine used to generate shock pulses, said machine being powered from a source of pressurized air and including a base and supported thereon a charge cylinder assembly having a pneumatically driven piston rod extending upwardly therefrom through an anvil flange, the uppermost end of said piston rod terminating at an impact plate on which a carriage assembly is mounted, said carriage assembly being useful for attaching test specimens thereto, said machine having control valves in the air supply lines connected to the lift, brake and charge pressure sections of said charge cylinder assembly, there additionally being provisions for inserting shock generator elements between said anvil and said impact plate, said apparatus comprising:
    means for measuring the instantaneous separation of said carriage assembly from said anvil and generating therefrom a first set of electronic signals indicative thereof;
    means responsive to the air pressure in said charge cylinder including the generation of a second set of electronic signals indicative of the measurement thereof;
    a computer including a memory and support logic for processing said first and second sets of electronic signal data and deriving therefrom commands in accordance with programmed instructions;
    a control panel coupled to said computer for inserting programmed instructions therein via a keyboard; and
    control valve actuating means responsive to commands derived in said computer in accordance with control panel instructions taken together with said first and second electronic signal data set measurements.

2. The invention as defined in claim 1 wherein the means for measuring separation includes:
    an optically encoded guide rod attached at one end to the side of said carriage so that it moves axially in synchronism therewith; and
    an optical source and sensor attached to the machine base and useful in monitoring the relative movement of said carriage with respect to said anvil, the measure of this movement being converted to a digital signal.

3. The invention as defined in claim 2 wherein the optically encoded guide rod is of T-shaped cross section having along its base leg a multiplicity of equispaced holes.

4. The invention as defined in claim 1 wherein the means responsive to air pressure includes a strain gauge cemented to a diaphragm which expands and contracts in proportion to changes in air pressure.

5. The invention as defined in claim 1 wherein the computer includes a microprocessor, read only memories, a random access memory and interface signal drivers and amplifiers.

6. The invention as defined in claim 1 wherein the control valves include solenoid actuated types.

7. In a shock pulse generating machine of the type wherein a carriage impacts a shock generating element supported on an anvil, apparatus for measuring the instantaneous separation between said carriage and said shock generating element comprising:
    an optically encoded guide rod attached to the side of said carriage and having the axis of said rod oriented so that the rod moves colinearly with said carriage;
    a source of illumination fixedly positioned with respect to said anvil, said illumination source being oriented to intersect the optical encodings on said guide rod; and
    an optical sensor for detecting the coded instantaneous positional data coming from the illuminated guide rod, said sensor including electronic amplifier means for translating the received information into a measure of the movement of said carriage relative to said anvil.

8. The invention as defined in claim 7 wherein the source of illumination is in the infrared part of the spectrum.

* * * * *